United States Patent
Chen

(10) Patent No.: US 6,729,493 B1
(45) Date of Patent: May 4, 2004

(54) BRAKE OIL EXTRACTOR

(76) Inventor: Jenn-Tzong Chen, P.O. Box 90, Tainan City (TW)

( * ) Notice: Subject to any disclaimer, the term of this patent is extended or adjusted under 35 U.S.C. 154(b) by 3 days.

(21) Appl. No.: 10/310,912

(22) Filed: Dec. 6, 2002

(51) Int. Cl.[7] .............................................. B65D 23/08
(52) U.S. Cl. ........................ 220/630; 220/737; 220/481; 248/146
(58) Field of Search .................. 220/630, 737, 220/481, 628, 629, 632, 631, 636, 603, 476; 248/146, 147

(56) References Cited

U.S. PATENT DOCUMENTS

| | | | | |
|---|---|---|---|---|
| 565,371 A | * | 8/1896 | Stadelman | 215/376 |
| 1,101,286 A | * | 6/1914 | Jones | 220/824 |
| 2,152,285 A | * | 3/1939 | Schirmer | 131/240.1 |
| 2,504,031 A | * | 4/1950 | Manning | 47/71 |
| 2,748,952 A | * | 6/1956 | Martin et al. | 211/74 |
| 2,916,184 A | * | 12/1959 | Hartley et al. | 220/636 |
| 3,212,661 A | * | 10/1965 | Robert | 248/313 |
| 5,186,350 A | * | 2/1993 | McBride | 220/739 |
| 5,299,700 A | * | 4/1994 | Beniacar | 215/12.1 |
| 5,687,874 A | * | 11/1997 | Omori et al. | 220/737 |
| 5,799,820 A | * | 9/1998 | Maas | 220/739 |

* cited by examiner

*Primary Examiner*—Joseph Man-Fu Moy

(57) ABSTRACT

A brake oil extractor includes a bottom base, oil storing tank and a cover. The bottom base is secured on a stationary object by bolts. The oil-storing tank has its polygonal wall correspondingly fitted in the polygonal engage groove of the bottom base. Thus, the cover can conveniently be turned open and separated from the oil storing tank for pouring out the brake oil inside the oil storing tank, able to avoid the brake oil leaking out or splashing over a user because of improperly holding the oil storing tank when turning open the cover.

1 Claim, 5 Drawing Sheets

BRAKE OIL EXTRACTOR

BACKGROUND OF THE INVENTION

1. Field of the Invention

This invention relates to a brake oil extractor, particularly to one provided with a bottom base having a polygonal engage groove for receiving a polygonal oil storing tank and bored therein with plural insert holes for bolts to pass therethrough and fasten the bottom base on a stationary object, convenient to turn open a cover and separate it from the oil storing tank for pouring out brake oil inside and able to prevent the brake oil from leaking out or splashing over a user because of improperly holding the oil storing tank when turning open the cover.

2. Description of the Prior Art

A conventional brake oil extractor, as shown in FIGS. 1 and 2, is composed of an oil-storing tank 1 and a cover 2. The oil-storing tank 1 is cylinder-shaped, having a combining portion 10 with female threads 11 provided at the upper side. The cover 2 to be threadably mounted on the oil storing tank is formed at the lower side with a combining portion 20 having male threads 21. The cover 2 can easily be mounted on the oil-storing tank 1 by threadably combining the combining portion 20 of the cover 2 together with the combining portion 10 of the oil-storing tank 1. However, a user has to hold the oil storing tank 1 with one hand and turn open the cover 2 with the other hand in order to pour out the brake oil inside the oil storing tank 1, easily resulting in the brake oil leaking out or splashing over a user in case of inadvertence.

SUMMARY OF THE INVENTION

The objective of the invention is to offer a brake oil extractor convenient to turn open a cover and separate it from an oil storing tank for pouring out the brake oil in the oil storing tank and able to avoid the brake oil leaking out or splashing over a user because of holding the oil storing tank improperly.

The feature of the invention is a bottom base formed with a polygonal engage groove having plural insert holes therein, an oil storing tank formed with a polygonal outer wall to be correspondingly fitted in the polygonal engage groove of the bottom base, and provided at the upper side with a combining portion with male threads, and a cover provided at the lower side with a combining portion having female threads to be threadably combined with the combining portion of the oil storing tank.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
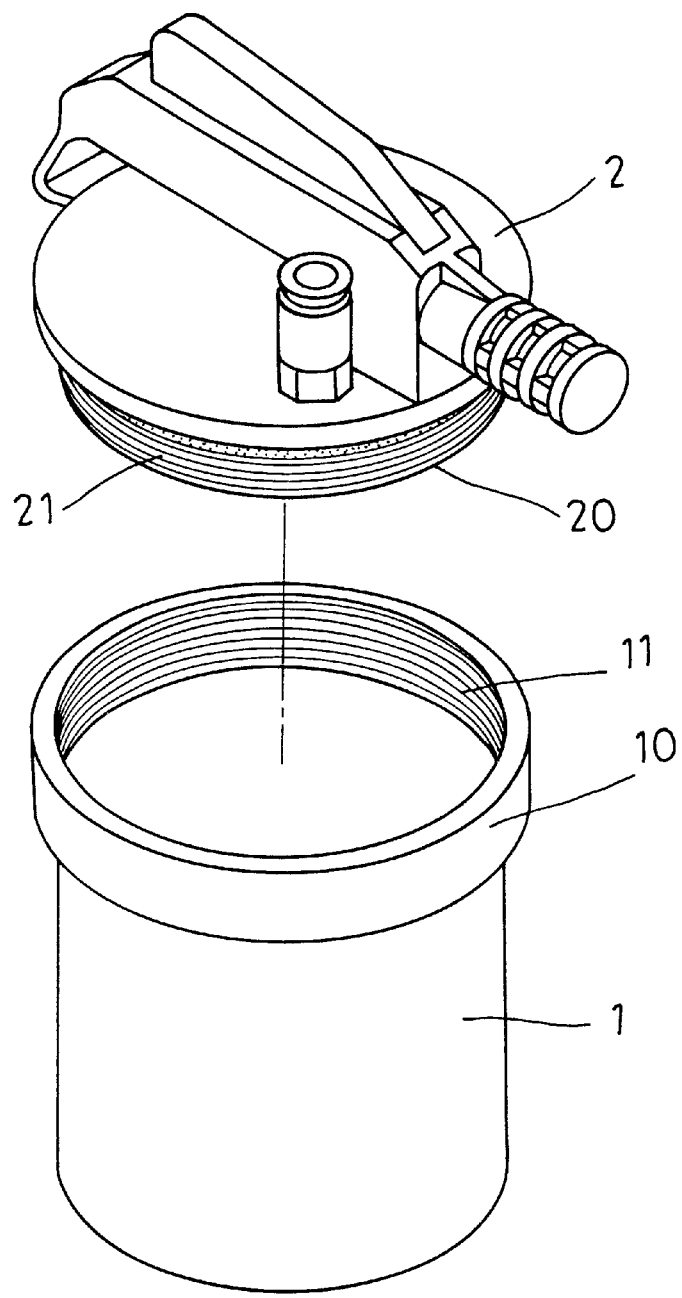
FIG. 1 is an exploded perspective view of a conventional brake oil extractor.
Figure 2:
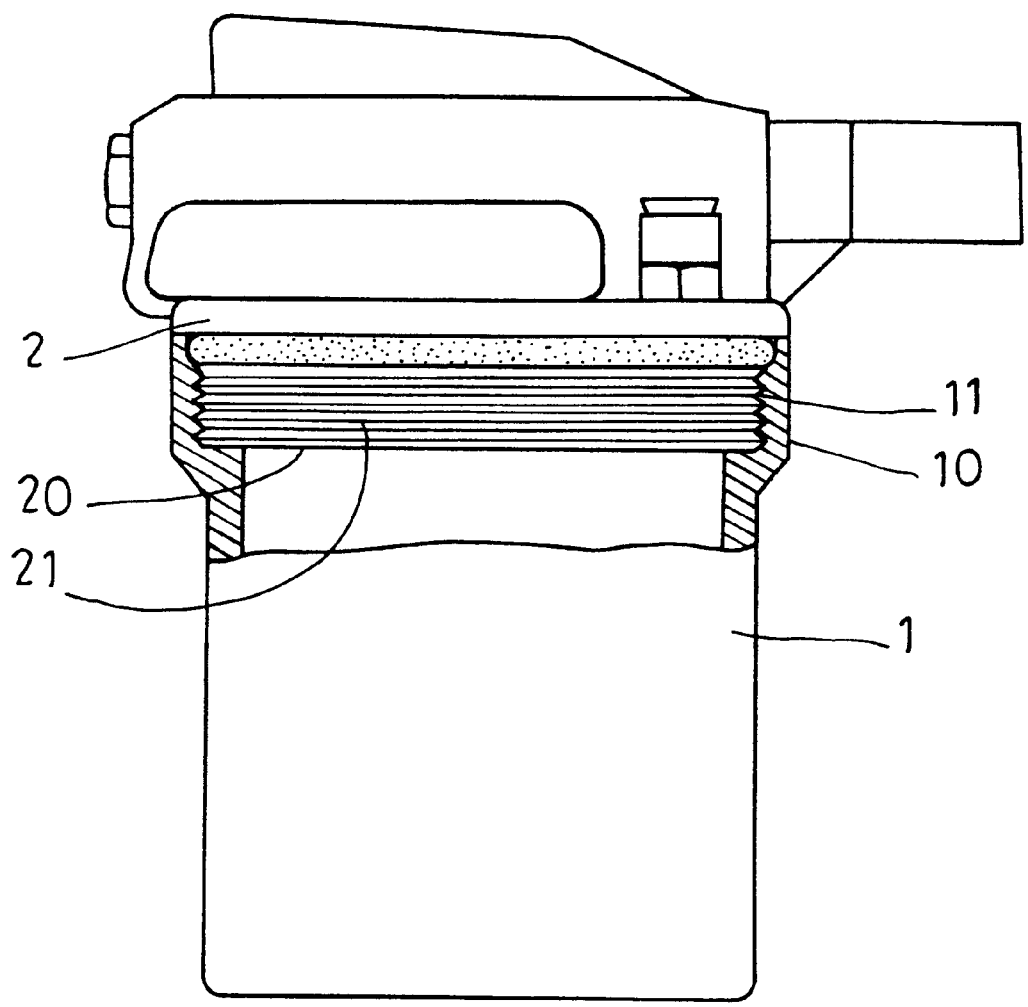
FIG. 2 is a cross-sectional view of the conventional brake oil extractor.
Figure 3:
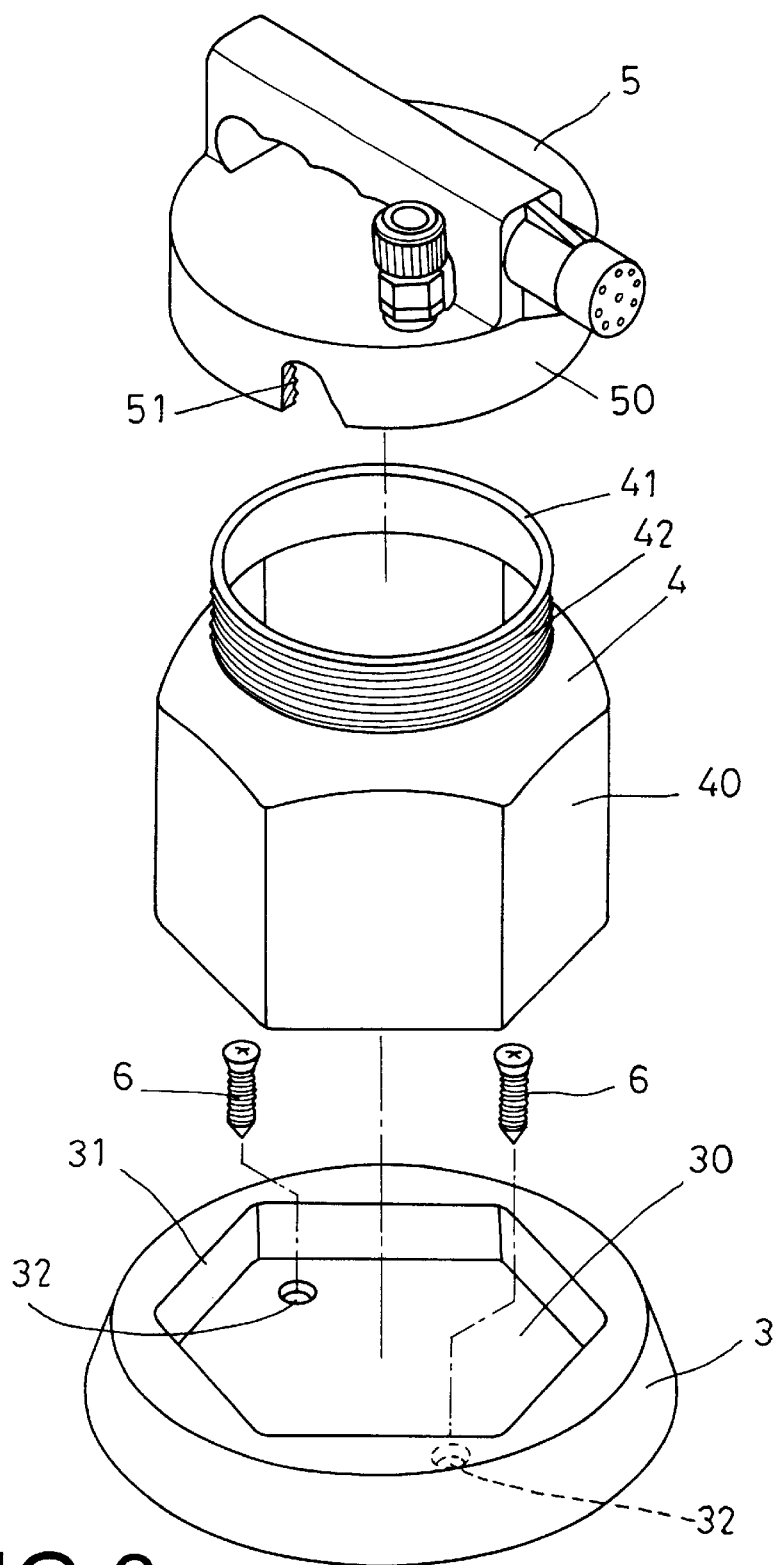
FIG. 3 is an exploded perspective view of a brake oil extractor in the present invention.

A preferred embodiment of a brake oil extractor in the present invention, as shown in FIG. 3, includes a bottom base 3, an oil-storing tank 4 and a cover 5 combined together.

The bottom base 3 is provided in the center with an engage groove 30 having a polygonal inner wall 31 and plural insert holes 32 inside.

The oil-storing tank 4 to be positioned in the engage groove 30 of the bottom base 3 is formed with a polygonal outer wall 40 matching with the polygonal inner wall 31 of the engage groove 30, and a combining portion 41 with male threads 42 at the upper side.

The cover 5 to be threadably mounted on the oil-storing tank 4 is provided at the lower side with a combining portion 50 with female threads 51.

Figure 4:
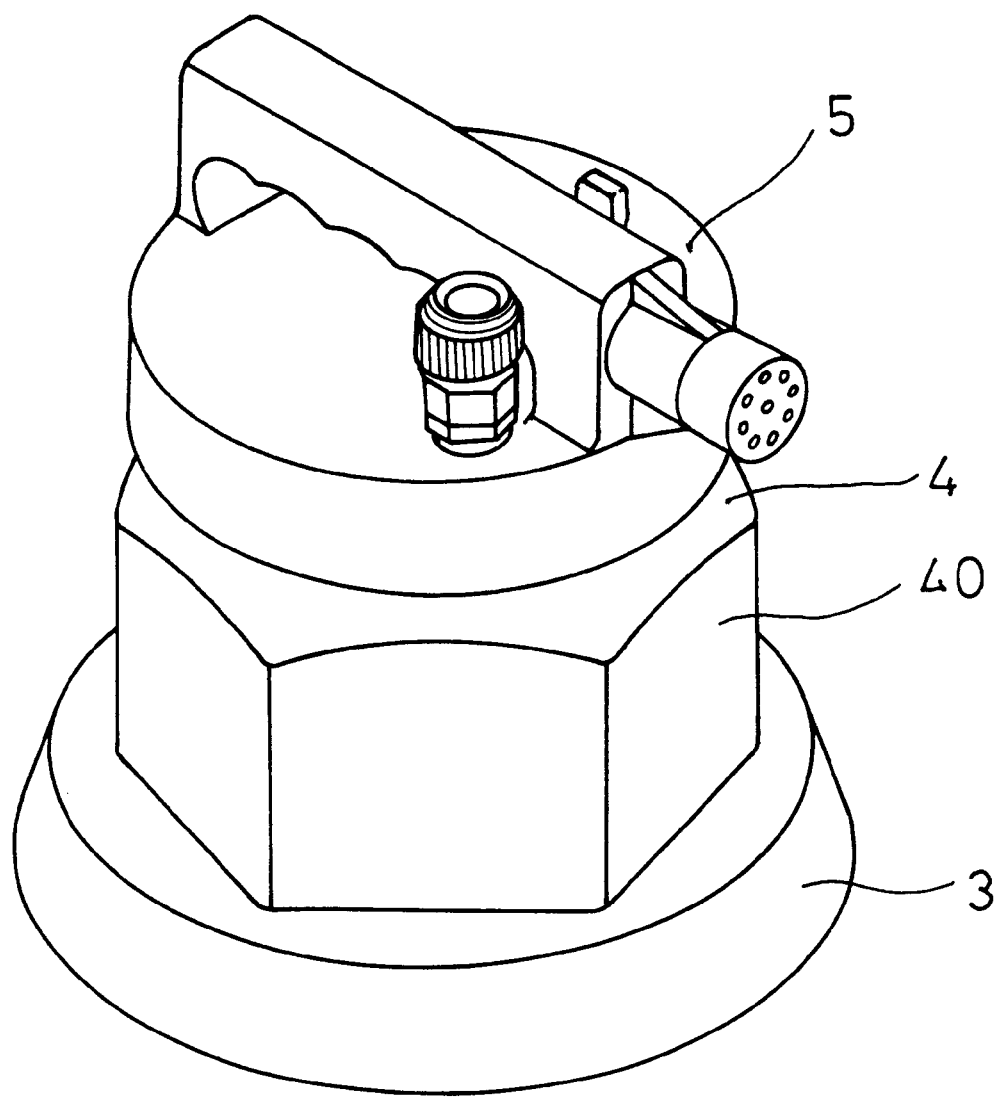
FIG. 4 is a perspective view of the brake oil extractor in the present invention; and, FIG. 5 is a cross-section view of the brake oil extractor in a used condition in the present invention.
Figure 5:
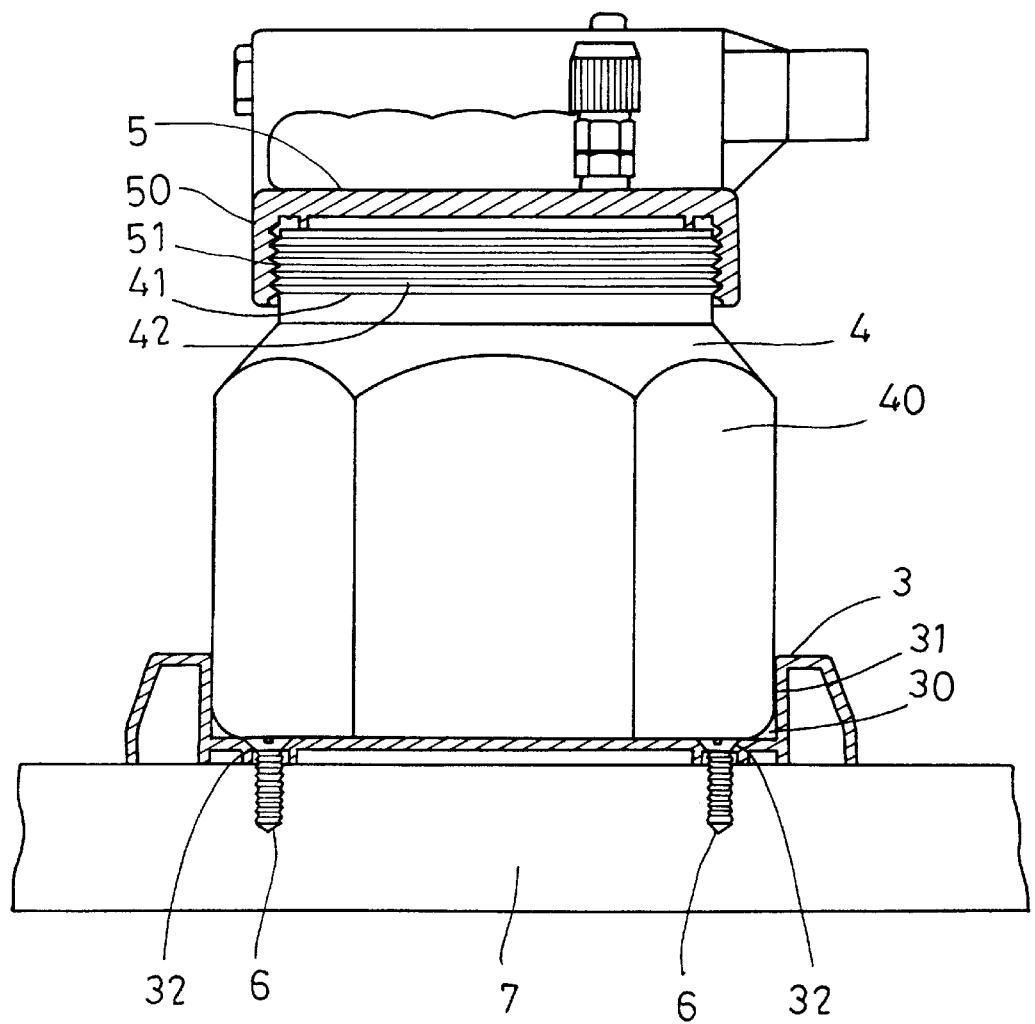

In assembling, as shown in FIGS. 3–5, firstly, the bottom base 3 is secured on a stationary object 7 by bolts 6 inserted through the insert holes 32 of the bottom base 3 and fixed on the stationary object 7. Next, the polygonal oil-storing tank 4 is correspondingly fitted in the polygonal engage groove 30 of the bottom base 3, and lastly the cover 5 is mounted on the oil-storing tank 4 by threadably combining the combining portion 50 of the cover 4 together with the combining portion 41 of the oil-storing tank 4.

In using, as shown in FIG. 5, the polygonal oil-storing tank 4 is correspondingly placed in the polygonal engage groove 30 of the bottom base 3. Next, the cover 5 is turned open and separated from the combining portion 41 of the oil storing tank 4 and finally, the oil storing tank 4 is removed out from the engage groove 30 of the bottom base 3 for pouring out the brake oil inside.

As can be noted from the above description, this invention has the following advantages.

1. The oil storing tank has its polygonal wall correspondingly engaged with the polygonal groove of the bottom base, convenient to turn open the cover and separate it from the oil storing tank to pour out the brake oil inside.

2. The oil storing tank is formed with a polygonal wall to be correspondingly engaged with the polygonal groove of the bottom base, able to prevent the brake oil in the oil storing tank from leaking out or splashing over a user because of holding the oil storing tank improperly when turning open the cover for pouring out the brake oil inside.

While the preferred embodiment of the invention has been described above, it will be recognized and understood that various modifications may be made therein and the appended claims are intended to cover all such modifications that may fall within the spirit and scope of the invention.

What is claimed is:

1. A brake oil extractor comprising:

a bottom base provided with an engage groove in the center, said engage groove formed with a polygonal inner wall and plural insert holes;

an oil storing tank to be placed in said polygonal engage groove of said bottom base, said oil storing tank formed with a polygonal outer wall matching with said polygonal inner wall of said engage groove of said bottom base, said oil storing tank further provided with a combining portion at the upper side, said combining portion formed with male threads;

a cover to be threadably mounted on said oil storing tank, said cover provided with a combining portion at the lower side, said combining portion formed with female threads; and, said bottom base secured on a stationary object by bolts, said bolts inserted through said insert holes of said bottom base and fixed on said stationary object, said oil storing tank having its polygonal wall correspondingly fitted in said polygonal engage groove of said bottom base, said cover turned open and separated from said oil storing tank for pouring out brake oil inside, able to avoid said brake oil leaking out or splashing over a user because of improperly holding said oil storing tank during turning open said cover.

* * * * *